United States Patent [19]
Häb-Umbach et al.

[11] Patent Number: 5,956,678
[45] Date of Patent: Sep. 21, 1999

[54] SPEECH RECOGNITION APPARATUS AND METHOD USING LOOK-AHEAD SCORING

[75] Inventors: Reinhold Häb-Umbach; Hermann Ney, both of Aachen, Germany

[73] Assignee: U.S. Philips Corporation, New York, N.Y.

[21] Appl. No.: 08/425,304

[22] Filed: Apr. 17, 1995

Related U.S. Application Data

[63] Continuation of application No. 07/944,553, Sep. 14, 1992, abandoned.

[30] Foreign Application Priority Data

Sep. 14, 1991 [DE] Germany .............................. 41 30 633

[51] Int. Cl.$^6$ ....................................................... G10L 5/06
[52] U.S. Cl. .......................... 704/256; 704/241; 704/253; 704/254
[58] Field of Search .............................. 381/41–47; 395/2, 395/2.6, 2.45, 2.61, 2.62, 2.63, 2.47, 2.5; 382/37, 38, 30; 704/236, 238, 241, 252, 253, 254

[56] References Cited

U.S. PATENT DOCUMENTS

| | | | |
|---|---|---|---|
| 4,805,219 | 2/1989 | Baker et al. | 381/43 |
| 4,910,783 | 3/1990 | Nakagawa | 381/43 |
| 4,977,598 | 12/1990 | Doddington et al. | 381/43 |
| 5,023,911 | 6/1991 | Gerson | 395/2.62 |
| 5,067,166 | 11/1991 | Ito | 382/37 |

OTHER PUBLICATIONS

"A Data Driven Organization of the Dynamic Programming Beam Search for Continuous Speech Recgonition" H. Ney et al, IEEE, 1987, pp. 833–836.

Xavier L. Aubert "Fast Look–Ahead Pruning Strategies in Continuous Speech Recognition", IEEE ICASSP '89 Proceedings, pp. 659–662, May 1989.

Patrick Kenny, Rene Hollan, Vishwa N. Gupta, Matthew Lennig, P. Mermelstein, and Douglas O'Shaughnessy, "A*—admissible heuristics for rapid lexical access", IEEE ICASSP '91 Proceedings, pp. 689–692, May 1991.

*Primary Examiner*—Allen R. MacDonald
*Assistant Examiner*—Tālivaldis Ivars Šmits

[57] ABSTRACT

In the recognition of coherently spoken words, a plurality of hypotheses is usually built up which end in various words during the recognition process and are then to be continued with further words. To keep the number of words yet to be continued as small as possible, especially in the case of a large vocabulary, it is known to carry out a look-ahead in a limited time space. It is suggested according to the invention to use the same phonemes for the look-ahead as for the actual recognition and to add together the differential sums obtained in the look-ahead for the evaluation of the partial hypothesis which has just ended and which is to be continued, and to compare this sum with a threshold value which depends on the extrapolated minimum total evaluation at the end of the time space of the look-ahead. The searching space for hypotheses to be continued can be limited by this in a particularly favorable manner.

10 Claims, 1 Drawing Sheet

SPEECH RECOGNITION APPARATUS AND METHOD USING LOOK-AHEAD SCORING

This is a continuation of application Ser. No. 08/944,553, filed Sept. 14, 1992 now abandoned.

FIELD OF THE INVENTION

The invention relates to a method for recognizing a sequence of words in a speech signal, said method comprising the steps of:

at recurrent instants sampling said speech signal for generating a series of test signals and executing a mainstream signal-by-signal matching and scoring between said test signals and various series of reference signals from a unitary set of reference signal series that each represent a vocabulary word.

Machine recognition of speech is a rapidly developing art. A general problem is the extremely great amount of processing operations required by a realistically large vocabulary of, for example, some 10000 words. In the past, a rudimentary kind of look-ahead has diminished the amount of processing to some extent.

Such look-ahead allows for selecting only those search paths that have sufficiently high probability to lead to the correct ultimate recognition.

The progress of the individual hypotheses within the words is often monitored by dynamic programming methods, that account for some time warping: the pace of progress of the actual speech does not conform to the progress prescribed by the model. Furthermore, language models at transitions between contiguous words allow to further increase recognition probability and to limit searching space. The searching space is limited, first by discarding hypotheses with excessive scores, and further by a look-ahead operation after the end of a word and before continuing partial hypotheses related to the next word. Thereto a sub-series of test signals is coarsely compared to reference signals. Then any actual hypothesis is only continued if its probability, independent of preceding context, is sufficiently high. Since the look-ahead evaluation takes place several test signal periods before they are used for the recognition proper, it is customary to introduce an appropriate delay between the two operations. Because this lasts at most a fraction of a second, even real-time recognition is hardly effected.

Generally, the look-ahead is also fast because it requires only a part of the operations necessary for the complete recognition. In particular, the complete validation of the preceding hypothesis is not required.

For speeding-up the look-ahead, in the known art the sequences of reference signals represent phonemes, and the vocabulary is constituted by a phoneme list, and each list position comprising a phoneme and indication of all possible subsequent phonemes, and if applicable, the identification of a word which ends with this phoneme and which comprises all preceding phonemes in the correct sequence. So, the vocabulary forms a tree in which the individual branches represent phonemes. These comprise special reference signals which are related to, but different from the reference signals used for the actual recognition. Furthermore, the probability, i.e. the score of the preceding hypothesis is not used, but only such word candidates are selected in the look-ahead continuation that have a good actual similarity to the corresponding speech signal section. A threshold value is used for this which preferably increases linearly during the progress of the look-ahead. This is because it should be prevented as much as possible that in the look-ahead a word candidate is eliminated which in the subsequent context actually represents the best hypothesis on the basis of the language model used, which hypothesis could be cut off on account of an unclearly pronounced word. For this reason, many hypotheses are continued, even though a large score was present at the conclusion preceding the continuation.

SUMMARY TO THE INVENTION

Now, amongst other things, the invention provides a method as recited which renders possible an effective reduction of the searching space combined with the smallest possible look-ahead activity.

According to one of its aspects, the object is realized in that it comprises in addition to those of the preamble, the following steps:

as from a particular second test signal subsequent to said first test signal executing a look-ahead signal-by-signal matching and scoring between a limited-length first sub-series of test signals with various second sub-series of reference signals from said unitary set, each second sub-series representing an initial part of a vocabulary word, each such second sub-series so producing an associated sub-score;

adding any said sub-score to any said first score for producing a respective aggregate score and discarding the latter second sub-series for any aggregate score surpassing a predetermined first threshold, but continuing said mainstream matching for any other sub-series of reference signals within the same set of series until attainment of a subsequent word termination and producing further said first score;

selecting coexistent minimum first score values for preliminarily recognizing any associated word string but otherwise discarding first strings;

recognizing said sequence as represented by a non-discarded said first string on the basis of an associated minimum value among various first scores.

Various notions herein are as follows:

generally, but not necessarily, the sampling instants are periodic;

at any particular instant one or more preliminarily recognized word strings could terminate simultaneously;

the matching and scoring may include dynamic programming features that by themselves are conventional;

at any instant only coexistently attained scores are compared; there may be other paths being followed that at that instant lead in fact separate lives.

To avoid creating too many candidates for the continuation of the process, first the reference signals that are used for the look-ahead are the same as those used for the actual recognition, so that calculations are quite similar. The number of sequences to be continued can be kept low in that the score at the end of the preceding sequence is added to the sub-score obtained in the look-ahead. In fact, when a preliminary recognition ends with a comparatively low score, a sufficiently large threshold value allows a large number of subsequences of reference signals to be continued, so that the hypothesis which is the most probable one overall is not lost. On the other hand, when a preceding hypothesis has ended with a large score, so that this hypothesis is unlikely anyway, the further recognition is continued with only a small number of sub-series, so that the recognition is always continued with those sequences only which promise the best chance of success. In this manner, the searching space can be kept small without involving the risk that the best possible hypothesis is lost in the process.

Advantageously, the first threshold has a predetermined algebraic relation to an actual minimum value among any aggregate score pertaining to any instantaneous said first score. The combined use of the best hypotheses both at the start and at the end of the sub-series leads to an error rate that is only slightly higher than with foregoing the look-ahead which foregoing would cause extra processing. A particularly realization is obtained in that the first threshold value is equal to the sum of the two scores plus a fixed threshold margin. This requires only few calculations.

Speech recognition methods are known whereby during the recognition process the comparison of the instantaneous test signal and the subsequent test signals with reference signals within the words is only continued if the score incurred up to the instantaneous test signal lies below a second threshold value which is equal to the minimum score for the instantaneous test signal plus a fixed threshold margin. In such methods it is particularly advantageous when the threshold margin for forming the first threshold value and for forming the second threshold value are equal. In this manner, the same criteria are used for the continuation or discontinuation of hypotheses both within words and at the transitions between words.

In the known methods it is customary that during the look-ahead after each comparison of a test signal with reference signals comparisons of subsequent test signals with reference signals are carried out only if the relevant score lies below a third threshold value. The third threshold value serves the purpose of completely eliminating continuations which promise little success by means of the look-ahead and the comparison with the third threshold value, in order to limit the searching space in this way. In known methods the third threshold value is accordingly critical in the sense that a too great threshold value leads to a too large searching space, whereas in the case of a too small threshold value that hypothesis which would turn out to be the best one at the end without look-ahead could be cut off by the look-ahead. In the method according to the invention, however, the third threshold value exclusively serves to reduce the calculations during the look-ahead. According to a further embodiment of the invention, therefore, it is favourable when the third threshold value is formed with a constant ratio to the smallest score of all reference signals in relation to this test signal. The third threshold value can be determined in this manner with little calculation activity. The calculation activity is particularly small when in this case the third threshold value is equal to the minimum score for this test signal augmented by a threshold margin. The threshold margin for the look-ahead may in this case also be smaller than the threshold margin for the recognition.

A compromise is to be made as to the time space over which the look-ahead is carried out, for a large time space means that the look-ahead itself requires a correspondingly greater calculation activity, which is in contradiction to the saving in actual recognition activity effected by the look-ahead, while a very small time space means that the look-ahead provides too little information for achieving a substantial saving in calculation time in the recognition process. An embodiment of the invention, accordingly, is characterized in that the look-ahead is carried out for the duration of one phoneme only. This already provides sufficient information for saving a considerable calculation time, especially when the vocabulary is available in the form of a tree list for the recognition, as is disclosed in patent application Ser. No. 08/563,853 which is a continuation of 07/944,554, herin incorporated by reference. In particular, the entire tree list of the vocabulary then is no longer required for the look-ahead, a simple list of all phonemes suffices, i.e. the first level of the tree list, all phonemes being present therein.

To reduce the calculation activity in the look-ahead still further, it is favourable according to a further embodiment of the invention that the look-ahead is not started until at the next even numbered test signal. It has been found that a sufficiently precise determination of the sequences to be continued is obtained thereby, which is not appreciably improved by starting the look-ahead at each test signal.

Since the same reference signals are used for the look-ahead and for the recognition, it is favourable according to a further embodiment of the invention that the scores between each test signal and reference signals determined during the look-ahead are put into intermediate storage and are subsequently used for the comparisons to be carried out in the recognition.

As a result, those comparisons which were already carried out during the look-ahead need not be carried out once more during the recognition, but their results may be taken over from the look-ahead.

The invention also relates to an apparatus for executing the method. Further advantageous aspects of the invention are recited in dependent Claims.

DESCRIPTION OF THE DRAWING

For a fuller understanding of the invention, reference is had to the following understanding of the invention, reference is had to the following description taken in connection with the accompanying drawings.

DETAILED DESCRIPTION OF A PREFERRED EMBODIMENT

Figure 1:
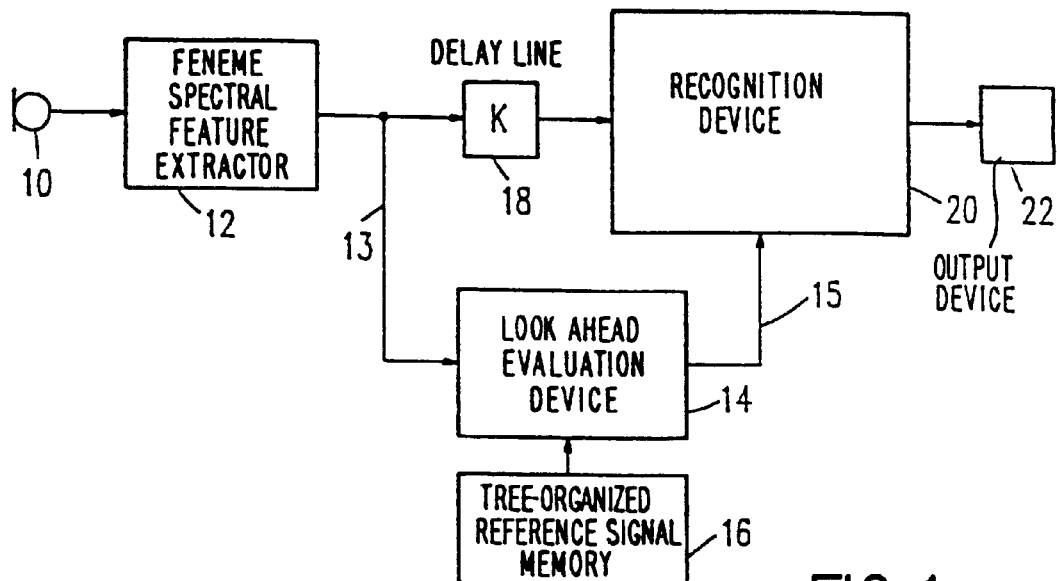
FIG. 1 shows a simplified block diagram of a device for speech recognition with look-ahead.

In FIG. 1, the speech signal obtained through microphone 10 is preprocessed in a device 12, where in particular the spectral components are digitized for consecutive speech signal sections, whereby the totality of the values which each represent a speech signal section forms a test signal. These test signals, which are present at line 13, are supplied on the one hand to a device 14 for a look-ahead evaluation and on the other hand to the recognition device 20 through a delay line 18, which delays the test signals by a predetermined number of signals K. This recognition device constructs the various hypotheses. Finally, the device 20 supplies the sequence of recognized words to an output device 22, for example, a display or a printer.

The device 20 for the actual recognition may be realized according to patent DE-OS-37 10 507. During the search, i.e. during processing of the consecutive test signals, a plurality of hypotheses is built up in that case in a searching space comprising the test signals and the reference signals, so that hypotheses with an unfavourable score that exceeds a threshold value, are discontinued, and whenever a possible word end is reached, a branching into a number of hypotheses leading into new words is started, which are determined preferably on the basis of a language model. Generally, the use of the above searching space has been described in a paper by H. Ney et al., A data driven organization of the dynamic programming beam search for continuous speech recognition; © 1987, IEEE, No. CH 2396-0/87/0000/0633.

In the arrangement pictured in FIG. 1, the words to be continued, so the comparisons with sequences of reference signals to be continued, are co-determined by the results of the look-ahead device 14, which are supplied to the device 20 through a connection 15.

Figure 2:
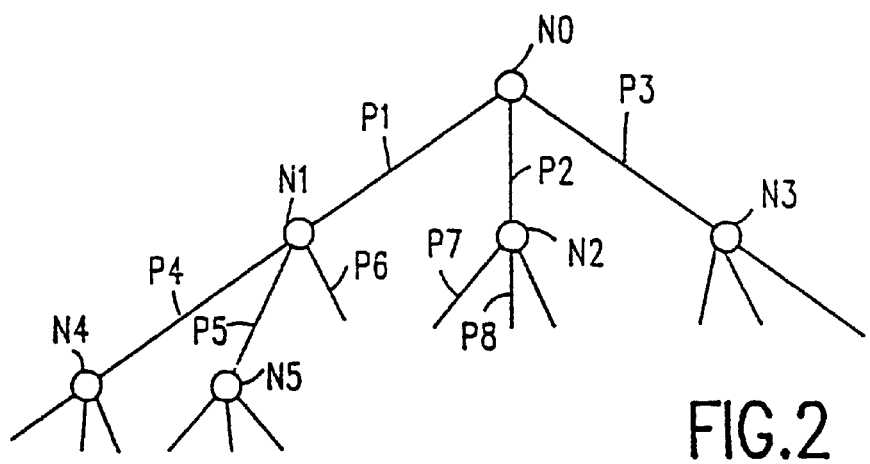
FIG. 2 shows the arrangement of the vocabulary for the look-ahead, and FIG. 3 diagrammatically shows the build-up of a phoneme from reference signals and the possible transitions between them.

In the device 14, the test signals are compared with all word beginnings of the vocabulary, i.e. each new test signal or, in order to reduce the calculation activity, each second new test signal is regarded as a possible word beginning. The reference signals used for this are contained in a memory 16 in a form as indicated in FIG. 2. According to this Figure, the entire programmed vocabulary is built up in the shape of a tree whose branches represent phonemes. The beginnings and ends of phonemes are junction points. The junctions may represent the end of a word. The junctions may also represent the start of a next phoneme of the word in question. Also a combination may occur, in that a particular string of phonemes represents a word, that may however proceed with one or more further phonemes to so represent a different word. FIG. 2 shows a simplified tree of a very small vocabulary. Starting from initial junction N0, it is assumed that only three phonemes P1, P2, P3 may form the beginning of any word. In practice this set is of course much larger. Certain phonemes may exist that cannot represent the beginning of a word. Now, phoneme P1 ends in junction N1, phoneme P2 ends in junction N2, phoneme P3 ends in junction N3. As shown, successive phonemes starting from junction N1 may be P4, terminating in junction N4, P5 terminating in junction N5, and P6. Successive phonemes from junction N2 are P7, P8. For simplicity, the remainder of the tree has not been shown. In principle, any junction N1, N2 . . . shown may constitute the end of a word. Furthermore, various phonemes P4, P5 . . . may be identical to one of the phonemes P1, P2, P3. The same applies to the group of phonemes P4, P5, P6 of which one or more may be identical to a respective phoneme starting from any other junction, such as N2, N3, N4, N5. A tree structure is generated in this manner which clearly comprises more junction points than the vocabulary comprises words. In fact, many junction points do not simultaneously represent a word end.

Figure 3:
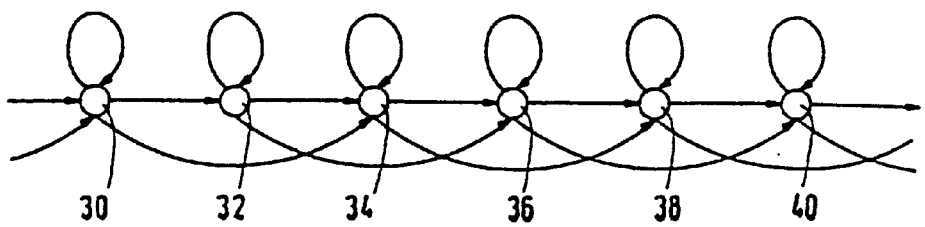

FIG. 3 diagrammatically shows the build-up of a phoneme from reference signals and the various transitions between those reference signals. In this example there are six reference signals 30, 32, 34, 36, 38 and 40 which are formally indicated as so many states. In practice, the phoneme may comprise more states or fewer states, and their number need not be uniform amongst the various phonemes. Moreover, FIG. 3 shows transitions between the states in the form of arrows. As shown, three transitions originate from each state, one of these transitions returning to the same state. This means that during the comparison between the test signal string and the reference signal string, the matching is optimum when two successive test signals are compared with the same reference signal. Furthermore, a further transition originates from each state to the second next state, which means that no test signal optimally fits a reference signal, for example, in the case of a quickly spoken sound. The normal way, however, leads from one state to the next state each time, i.e. a phoneme is then formed by six consecutive test signals. Finding the optimal transition from one state to another state is done by the dynamic programming method.

In device 14, each test signal is now compared with reference signals of which each respective sequence of reference signals represents a different phoneme. Without the use of a threshold, each test signal would be compared with all reference signals of all phonemes. This is because it should be assumed that each test signal represents the beginning of a phoneme, i.e. it should be compared with the first reference signal of all phonemes, but it could also be that this same test signal is the second test signal belonging to a phoneme, so that it is to be compared with the second reference signals of the phonemes. In the latter case, the preceding test signal correspond to the first reference signal of the phoneme, and the comparison result of this previous signal, i.e. its difference with the relevant reference signal, is to be added to the score of the second test signal. Similarly, the instantaneous test signal may also be the third or a subsequent test signal of the phoneme, so that in that case the overall scores formed by summation of the differences become greater. A searching space is accordingly created at the phoneme level from consecutive test signals and all reference signals, in which each grid point of the searching space is assigned a score.

To reduce the calculation activity also in the look-ahead, it is tested for each new test signal whether a score created thereby exceeds the minimum score attained for this test signal by a given threshold value. If this is the case, the corresponding hypothesis in the phoneme is no longer followed. Occasionally, a phoneme itself is also disqualified for the further look-ahead, and thus also for the subsequent recognition. The use of the threshold value within the phonemes only serves to reduce the calculation activity.

This holds in a similar manner also for sequences of phonemes in which according to FIG. 3 a phoneme need not be completely finished to the end, but a next phoneme can be reached starting from the penultimate state or reference signal. The deciding factor here is what score has been reached for the phonemes or phoneme sequences which are scanned by a number of test signals, this number being determined by the delay device 18 and designated with K. These phonemes or phoneme sequences or words are supplied together with their scores to the recognition device 20 through the connection line 15. When in this recognition device 20 a hypothesis reaches the end of a word, it is known from the said data supplied through the connection line 15 which hypotheses to be continued result in additional scores after K test signals of what values. Of the phonemes transmitted through connection line 15, however, only those are used for continuing the hypotheses in which a continuation extrapolated by K test signals leads to a score, or more precisely an evaluation which results from the scores and the consideration of a language model, whereby a threshold value is not exceeded, which value is formed from the minimum extrapolated score and a threshold margin. The following condition must accordingly be satisfied:

$$S^E_{v1 \ldots vn}(1:I)+S_w(I+1:I+K)+S_{LM}(w/v1\ldots vn)$$

$$\leq S_{min}(I)+S_{min,LA}(I+1:I+K)+T$$

In which $S^E_{v1 \ldots vn}(1:I)$ represents the evaluation at the end of the word sequence v1. . . vn for test signal I, $S_w(I+1:I+K)$ is the score in the look-ahead for the next K test signals for the phoneme sequence or for the word w, $S_{LM}(w/v1 \ldots vn)$ is an additive quantity due to the language model when the word sequence v1 . . . vn is joined to the word w, $S_{min}(I)$ is the minimum score for test signal I, $S_{min,LA}(I+1:I+K)$ is the minimum score which has resulted for all subsequent phoneme sequences or phoneme words after K test signals in the look-ahead, and T is a fixed threshold margin.

In this manner, therefore, not only the look-ahead but also the total evaluation taking place at the end of each partial hypothesis in the recognition device 20 is taken into account, so that a partial hypothesis which ends with a bad total evaluation is continued with only few phoneme sequences or words which show a particularly good correspondence to the immediately following test signals. Partial hypotheses which end with a good total score, on the other hand, are continued with a larger number of phoneme sequences or words.

In this manner the searching space of the recognition device 20 is kept as small as possible at all times.

It may be sufficient for this reason to carry out the look-ahead only for the duration of a single phoneme. In that case, moreover, the full vocabulary in the form of the tree list need not be available for the look-ahead, but the simple list of all phonemes suffices. Since most phonemes have a duration of approximately 60 to 70 ms, while the time intervals at which a new test signal is obtained each time is 10 ms, these phonemes will consist of six consecutive reference signals, so the value K=6. If a phoneme is shorter or if the end of a phoneme is reached after a smaller number of test signals, all scores obtained during the look-ahead must be divided by the respeactual actual phoneme length in order to obtain comparable values.

A further reduction of the calculation activity is achieved in that the look-ahead is only started at an even-numbered test signal. During the look-ahead each test signal is then used, however. The somewhat unfavourable adaptation at the start resulting from this is largely compensated for by the adaptation within the phoneme by means of the dynamic programming, and a small residual error in the scores owing to a delayed start of the look-ahead may be accommodated by the threshold value for the subsequent decision as to how a partial hypothesis is to be continued in the recognition device 20. Since concluding partial hypotheses may in general take place at any test signal, the values of the look-ahead supplied to the recognition device 20 through the connection line 15 are used at two consecutive test signals each time.

Since in the look-ahead in device 14 all scores are formed which are subsequently needed for the recognition in the recognition device 20, these scores are in fact calculated only once and then put into intermediate storage and fed to the recognition device 20 with a suitable time delay also via the connection line 15. The calculation activity can be further reduced by this.

It is obvious that the device 14 for look-ahead and the recognition device 20 may be integrated into one single device, in which case they may advantageously be formed by a microprocessor or suitably equipped computer.

We claim:

1. A method of recognizing a sequence of words in a speech signal comprising the steps of:

sampling said speech signal at predetermined periods;

generating a series of test signals from said sampled speech signal;

signal-by-signal matching a first test signal with a set of reference signals, each reference signal representing at least a portion of a word;

assigning a first score to a first string of preliminarily recognized words terminating at said first test signal;

generating a look-ahead second sub-series, each of said second sub-series representing at least a subsequent part of a word recognized in an earlier match;

signal-by-signal matching a subsequent second test signal with said subsequent sub-series of said set of referenced signals;

assigning an associated sub-score for each second sub-series;

combining said first score with each sub-score to produce a respective aggregate score;

discarding each second sub-series when said corresponding aggregate score surpasses a first threshold value, and continuing said signal-by-signal matching for any subsequent sub-series when said corresponding aggregate score does not surpass said first threshold value until a word termination is received;

producing a final score equal to said first score plus each said respective sub-score; and recognizing said first string of preliminarily recognized words by a non-discarded first string having a minimum final score value.

2. A method as claimed in claim 1, wherein the first threshold has a predetermined algebraic relation to an actual minimum value among any aggregate score pertaining to any instantaneous said first score.

3. A method as claimed in claim 2, wherein said predetermined relation is a fixed threshold margin.

4. A method as claimed in claim 3, wherein any said first string is discarded upon exceeding said fixed threshold margin with respect to an actual minimum score.

5. A method as claimed in claim 1, wherein during said look-ahead matching a running preliminary sub-scoring is effected and said look-ahead matching is terminated for any running preliminary sub-score exceeding a predetermined third threshold.

6. A method as claimed in claim 5 wherein said third threshold equals an actual minimum running preliminary sub-score plus a third margin.

7. A method as claimed in claim 1, wherein each sub-series correspond to a single phoneme's length.

8. A method as claimed in claim 1, wherein any said second test signal is even-numbered.

9. A method as claimed in claim 1, wherein any scoring data gathered during said look-ahead matching is saved for use in said mainstream matching.

10. An apparatus for recognizing a sequence of words in a speech signal, comprising:

input means for receiving said speech signals;

sampling means responsive to the input means for at predetermined intervals, sampling said speech signal and generating a test signal at each interval;

storage means for storing a set of reference signals;

the first scoring means for signal-by-signal matching a first of said test signals to any of said reference signals and assigning a score to any first string of preliminary recognized words terminating at said first test signal;

look ahead generation means for generating at least one limited-length subsequent sub-series of reference signals, each of said subsequent sub-series representing a subsequent part of a word string recognized in an earlier signal-by-signal match;

look-ahead scoring means for signal-by-signal matching a next subsequent of said test signals and a respective subsequent sub-series and assigning a look-ahead score to each of said sub-series;

determining means for combining the first score and the look-ahead score and discarding the look-ahead score if the look-ahead score exceeds a predetermined threshold value and continuing said signal-by-signal matching for any subsequent sub-series when said corresponding aggregate score does not surpass said predetermined threshold value until a word termination is received; and recognizing means for recognizing a string of preliminarily recognized words of a non-discarded word string having a minimum aggregate score.

* * * * *